Patented Feb. 8, 1944

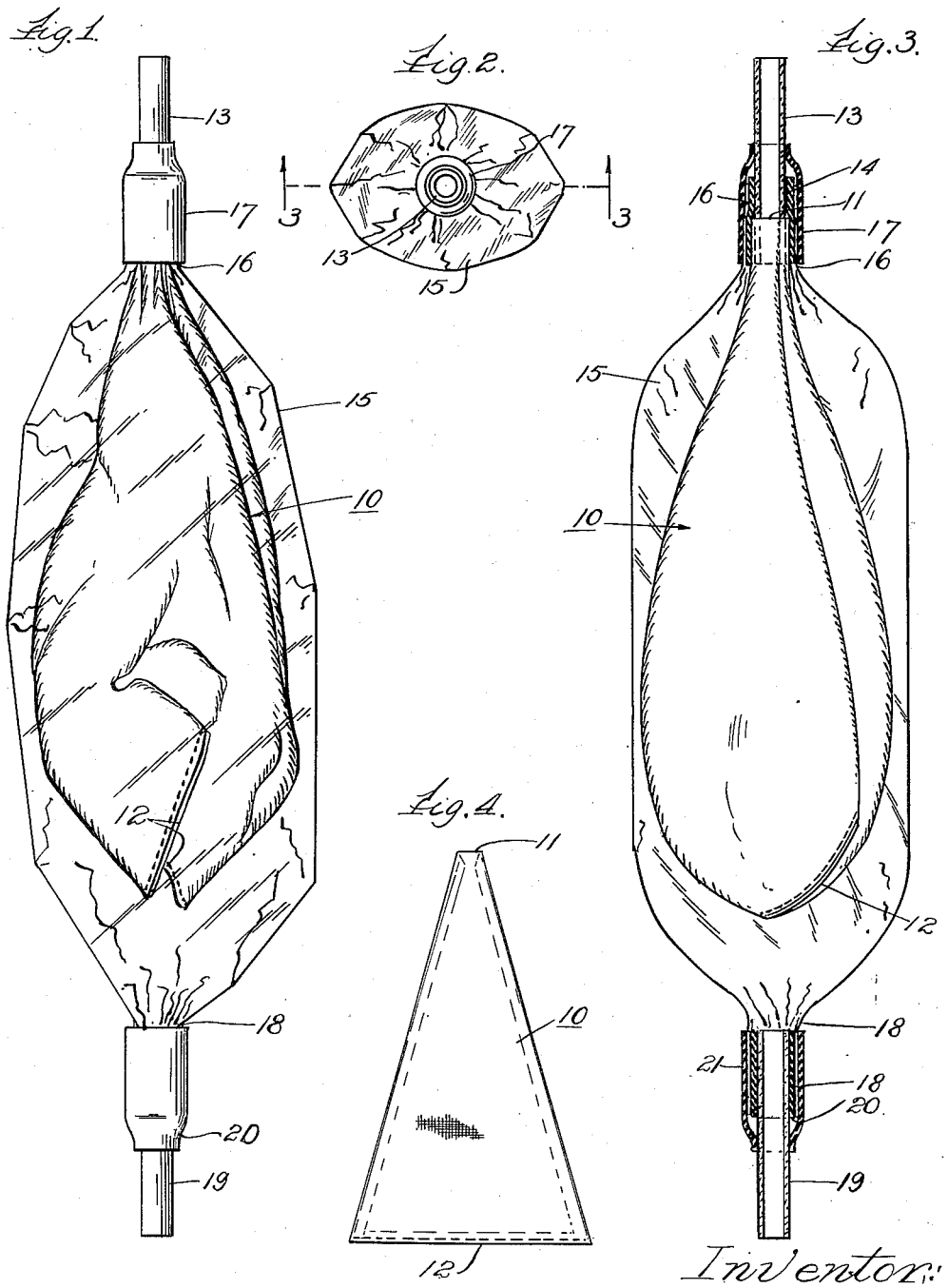

2,341,114

UNITED STATES PATENT OFFICE 2,341,114

DISPOSABLE FILTER FOR BLOOD AND PLASMA TRANSFUSIONS

Milan Novak, Lombard, Ill.

Application February 16, 1943, Serial No. 476,117

4 Claims. (Cl. 210—164)

My invention relates to a disposable filter for blood and plasma transfusions.

Accumulation of fibrin and gelatinous material in stored blood and plasma is commonplace despite the use of sufficient sodium citrate solution. The macroparticles become more numerous with increased age of the stored product and are a serious hazard in the administration of blood and plasma.

There is universal agreement among reputable authorities that filtration of blood and plasma must be carried out previous to intravenous administration. Metal screens in common use are expensive, difficult to clean and are either too coarse to retain the undesirable material or else they are so fine that they become clogged easily. The use of cotton gauze should be condemned, for cotton fibers may be liberated into the filtered product. The open method usually employed allows air contamination with bacteria to take place. Other methods which have been proposed are impractical from the standpoint of breakage and difficulty encountered in cleaning the apparatus.

It is among the objects of this invention to solve these problems by providing a filter which will yield a filtrate free of fibrin or gelatinous accumulations, which will not clog or leak while in use, and which will allow continuous filtration during administration of the blood and plasma. Another object of my invention is to provide a filter which is so constructed and so inexpensive as to be used only once and then disposed of, thereby permitting filtration under aseptic conditions and eliminating the uncertain, laborious and delaying cleaning procedures.

My invention also contemplates such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Referring to the drawing, Fig. 1 is an elevational view of my disposable filter for blood and plasma transfusions; Fig. 2 is a top plan view thereof; Fig. 3 is a sectional view on line 3—3 of Fig. 2, and Fig. 4 is a reduced detailed elevational view of my bag.

The embodiment selected to illustrate my invention comprises a bag 10 of disposable viscose rayon sheer cloth or the like preferably formed of two triangular shaped pieces of said material sewed together with the exception of opening 11 at the top thereof. I prefer that the height of my bag be substantially twice the width of its base 12.

Extending within opening 11 is the inner end portion of inlet tube 13 which is held in that position by tight fitting band 14 of rubber or the like.

Surrounding bag 10 is a transparent casing 15 of cellulose or other suitable disposable material. The casing 15 has a tubular body portion to surround bag 10 and has open ends. The upper end portion 16 of casing 15 is gathered around band 14. Another tight fitting band 17 is positioned around upper end portion 16 and a part of inlet tube 13 for attachment of said parts and for providing a seal. The bag 10 is thus suspended within casing 15 and the base 12 is spaced from the lower end portion 18 of casing 15 which is gathered around the upper end portion of outlet tube 19. A band 20 is positioned around the upper end of outlet tube 19. Another tight fitting band 21 is positioned around the gathered lower end portion 18 and a part of outlet tube 19 for attachment of said parts and to provide a seal.

In use my inlet tube 13 is attached to a tubing leading to a source of blood, and plasma mixed with sodium citrate solution. The outlet tube 19 is attached to the injection portion of a suitable transfusion set. The blood and plasma flows through inlet tube 13 into bag 10 and is filtered out into casing 15 and out outlet tube 19 for injection.

My filter provides efficient and rapid filtering action without clogging made possible by the large filtering area. It does not leak. Its construction is simple and inexpensive so that it need be used but once and then discarded. Its lightness, compactness, and disposability are features especially suitable to military conditions.

The cost of labor and materials required to make an entirely new filter for each transfusion is less than the cost of labor and breakage involved in cleaning the metal or glass filters now in common use. The problem of reactions attributed to unclean filters is eliminated.

While I prefer that tight fitting bands 14, 17, 20 and 21 be made of rubber, yet they may be made of any material adapted to act as a sealing means.

Having thus described my invention, I claim:

1. A disposable filter for blood and plasma transfusions comprising a triangular shaped bag of viscose rayon material having an opening in its top portion, an inlet tube having an upper end adapted for attachment to a transfusion set and a lower end extending into said opening, a band attaching said bag to said inlet tube, a casing of cellulose material surrounding said bag and having upper and lower open end portions, said upper end portion of said casing gathered around said band, another band positioned around said gathered upper end portion of said casing, an outlet tube having a lower end adapted for attachment to a transfusion set and an upper end, a band positioned around said upper end of said outlet tube, said lower end portion of said casing gathered around said last mentioned band, and another band positioned around said gathered lower end portion of said casing.

2. A disposable filter for blood and plasma transfusions comprising a bag of disposable rayon material having an opening in its top portion, an inlet tube having an upper end adapted for attachment to a transfusion set and a lower end extending into said opening, a band attaching said bag to said inlet tube, a casing of leakproof, disposable cellulose material surrounding said bag and having upper and lower open end portions, said upper end portion of said casing gathered around said band, another band positioned around said gathered upper end portion of said casing, an outlet tube having a lower end adapted for attachment to a transfusion set and an upper end, a band positioned around said upper end of said outlet tube, said lower end portion of said casing gathered around said last mentioned band, and another band positioned around said gathered lower end portion of said casing.

3. A disposable filter for blood and plasma transfusions comprising inlet and outlet tubes adapted for attachment to a transfusion set, a disposable cellulose casing extending between and sealed to said tubes, and a filter bag of viscose rayon material attached to said inlet tube and suspended within said casing.

4. A disposable filter for blood and plasma transfusions comprising inlet and outlet tubes adapted for attachment to a transfusion set, a disposable cellulose casing of leakproof disposable material extending between and sealed to said tubes, and a filter bag of disposable rayon material attached to said inlet tube and suspended within said casing.

MILAN NOVAK.